Jan. 19, 1954  B. GROSS  2,666,804
LEAD-IN TERMINAL
Filed Aug. 15, 1950
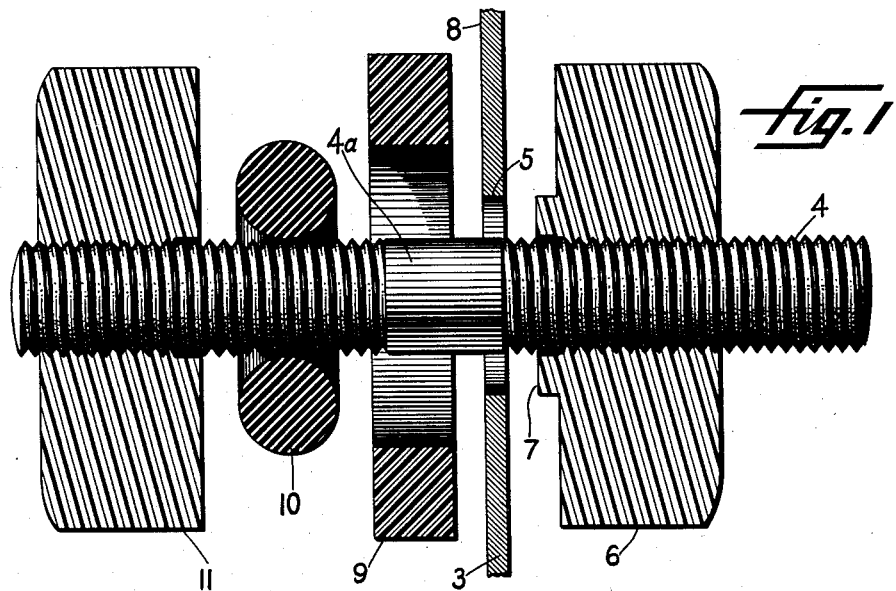
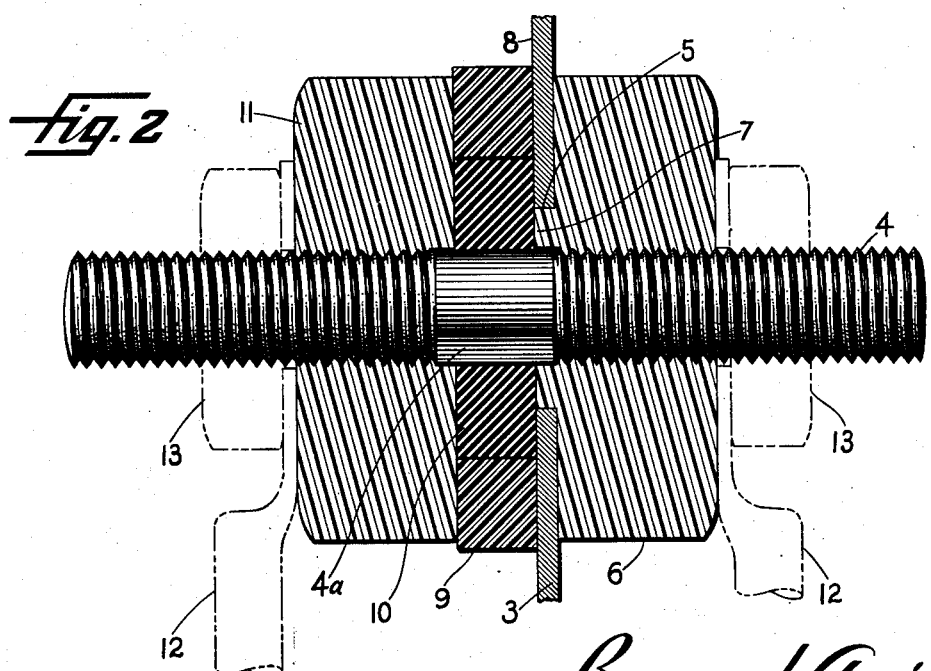
Bernard Gross
INVENTOR.
BY Everett N. Curtis
ATTORNEY Patented Jan. 19, 1954

2,666,804

UNITED STATES PATENT OFFICE 2,666,804

LEAD-IN TERMINAL

Bernard Gross, San Diego, Calif., assignor to Rohr Aircraft Corporation, Chula Vista, Calif., a corporation of California Application August 15, 1950, Serial No. 179,433

2 Claims. (Cl. 174—153)

My invention relates to a lead-in terminal employed where insulating and sealing properties are required around an electric terminal passing through a wall.

It is an object of this invention to provide a lead-in terminal with high insulating and sealing properties.

Another object is to provide a lead-in terminal which will bear a shear load while retaining insulating and sealing properties.

Still another object is to provide a device of this class which may be dismantled and reinstalled without impairment of its original insulating and sealing properties.

A further object is to provide a device of this class which is simple and economical to manufacture and install.

Other objects are apparent in the description as hereinafter set forth.

There are many types of electrical apparatus which require lead-in terminals for connection to internal elements. Such lead-in terminals are provided in the casings of electric motors and generators, the walls and bulkheads of transformers, and other structures which support electrical apparatus. In many cases it is necessary to provide a seal around the lead-in terminal to prevent the loss of fluids, such as oil in a transformer, or to prevent moisture or air from entering the electrical unit. It is also necessary that the lead-in terminals be well insulated from the casings or walls through which they must pass.

Most of the existing means for insulating and sealing lead-in terminals utilize rubber bushings in some form to insulate the lead-in terminal from the wall through which it must pass and to provide a seal. In many cases this type of insulation and seal is entirely satisfactory, however, rubber bushings are a frequent source of trouble where the lead-in terminal must support a shear load. Where such rubber bushings are subjected to shear loads and, as is frequently the case, to severe vibration, their insulating and sealing properties are very likely to break down. My improved lead-in terminal provides the necessary rigidity for supporting shear loads while still maintaining a high degree of electrical insulation and an effective seal.

Attention is invited to the accompanying drawing illustrating a preferred form of my invention, in which:

Figure 1 is a side view showing in section a lead-in terminal partially assembled.

Figure 2 is a side view showing in section a lead-in terminal completely assembled.

In Figures 1 and 2 the wall 3 represents the wall or casing through which the threaded conductor 4 must pass. The threads on conductor 4 are interrupted by an unthreaded central portion 4a, as shown. The diameter of the said conductor 4 is less than that of the aperture 5 in the said wall 3. Suitably threaded to engage one end of the conductor 4 is the nut 6, constructed of rigid insulating material and having on its base surface a disc-shaped projection 7 adapted to fit snugly within the aperture 5. The length of said projection 7 is equal to the thickness of the wall 3, so that in the assembled position its flat face is flush with the surface 8 of said wall, and adjacent to the unthreaded portion 4a of the conductor 4, as shown in Figure 2. Surrounding the unthreaded central portion 4a is the annular retainer 9, having a central bore and constructed of rigid insulating material. Positioned within the bore of said retainer 9 and closely engaging the said unthreaded central portion 4a, is the ring 10, constructed of resilient insulating material, said ring being essentially of a torus shape, having a cross sectional diameter greater than the thickness of the said retainer 9, as shown in Figure 1. The retainer 9 and the ring 10 described herein are the subject matter of Patent No. 2,396,005, relating to sealing devices. Suitably threaded to engage the end of the conductor 4 is the nut 11, the base surface of which is intended to bear against the ring 10 and the retainer 9. Terminals 12 may be attached to the conductor 4 by means of nuts 13.

It may be seen in Figure 2, that when the nuts 6 and 11 are tightened, the resilient ring 10 is deformed into sealing contact with the base surface of nut 11, the unthreaded central portion 4a of the conductor 4, the bore of the retainer 9, the contiguous portions of the wall 3, and the surface of projection 7. The rigid insulating nut 6 and the rigid insulating retainer 9, in combination with the compressed resilient ring 10, provide the necessary rigidity to the conductor 4 for supporting shear loads while maintaining electrical insulation and an effective seal.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

By the following terms used in the specification and in the appended claims, I intend to be understood as meaning:

"Rigid insulating material"—one of the thermosetting electrical insulating materials such as phenol formaldehyde types, two of which are commonly known under the trade names of Micarta and Formica, urea type compounds, or any other electrical insulating material which has firmness and shear strength sufficient to carry loads for the particular application.

"Resilient insulating material"—any of the insulating materials with resilient properties, such as rubber, synthetic rubber, or compounds of these.

What I claim and desire to secure by Letters Patent is:

1. A lead-in for conducting electric current from an apertured electric terminal on one side of a metal wall to an apertured electric terminal located on the opposite side of said wall, said wall having a circular opening therethrough and the sides of the wall for a substantial distance around the opening lying entirely in two parallel planes, said lead-in comprising: an electrical conductor having screw threaded ends passing through the apertures in said terminals and supporting said terminals, said conductor having a smooth cylindrical central portion, the diameter of which is substantially smaller than the diameter of said circular opening; a nut of rigid insulating material in threaded engagement with one end of said conductor, said nut having at one end thereof an integral projection whose peripheral surface engages the marginal wall of said circular opening, the length of said projection being substantially equal to the thickness of said metal wall; an annular retainer composed of rigid insulating material and having a cylindrical bore through which said conductor passes, the diameter of said bore being substantially greater than the diameter of the circular opening in said wall; a ring of resilient insulating material positioned within said bore and surrounding the smooth portion of said conductor, said ring being essentially of a torus shape having a cross sectional diameter greater than the thickness of said retainer; and a second nut in threaded engagement with the other end of said conductor, the end face of said second nut having a diameter substantially greater than the outside diameter of said ring, the tightening of said second nut causing said ring to be deformed and forced into sealing contact with the said end face of said second nut, the smooth portion of said conductor, the side of said wall and the end face of said projection.

2. A lead-in terminal as claimed in claim 1; in which said second nut is composed of insulating material and the end face thereof in engagement with said ring substantially covers the end face of said retainer.

BERNARD GROSS.

References Cited in the file of this patent

UNITED STATES PATENTS

| Number | Name | Date |
|---|---|---|
| 789,433 | King | May 9, 1905 |
| 2,186,934 | Palmer | Jan. 16, 1940 |
| 2,235,429 | Henry et al. | Mar. 18, 1941 |
| 2,396,005 | Gross et al. | Mar. 5, 1946 |
| 2,418,729 | Schemers | Apr. 8, 1947 |

FOREIGN PATENTS

| Number | Country | Date |
|---|---|---|
| 525,199 | France | May 30, 1921 |